United States Patent [19]

Schard

[11] Patent Number: 4,541,740
[45] Date of Patent: Sep. 17, 1985

[54] LUBRICATING ROTOR BEARINGS IN OPEN END SPINNING MACHINES

[75] Inventor: Lothar Schard, Sindelfingen, Fed. Rep. of Germany

[73] Assignee: SKF Kugellagerfabriken GmbH, Schweinfurt, Fed. Rep. of Germany

[21] Appl. No.: 578,668

[22] Filed: Feb. 9, 1984

[30] Foreign Application Priority Data

Feb. 12, 1983 [DE] Fed. Rep. of Germany ....... 3304912

[51] Int. Cl.$^4$ ............................................ F16C 33/66
[52] U.S. Cl. ..................................... 384/473; 384/474
[58] Field of Search .............. 308/187, 184 R, 189 R, 308/207 R; 384/322, 385, 400, 401, 403

[56] References Cited

U.S. PATENT DOCUMENTS 2,635,198  4/1953  Wieseman ................... 308/187 X
3,608,987  9/1971  Jordan ......................... 308/187

FOREIGN PATENT DOCUMENTS 2069071  8/1981  United Kingdom ............. 308/187

Primary Examiner—Stuart S. Levy
Assistant Examiner—David Werner
Attorney, Agent, or Firm—Murray Schaffer

[57] ABSTRACT

A rotor bearing assembly is provided wherein a shaft is journalled within a housing by a pair of spaced bearings packed in a quantity of grease. An oil guide surrounds the shaft and a storage space between the guide and the housing is formed for retaining a supply of grease capable of releasing oil into the guide to replenish the packing. A fresh supply of grease is periodically introduced into the storage space through an inlet extending through the housing. An outlet extends through the housing for discharging a corresponding quantity of grease from the storage space into a collection chamber exterior of the housing which receives and holds the discharged grease.

2 Claims, 1 Drawing Figure

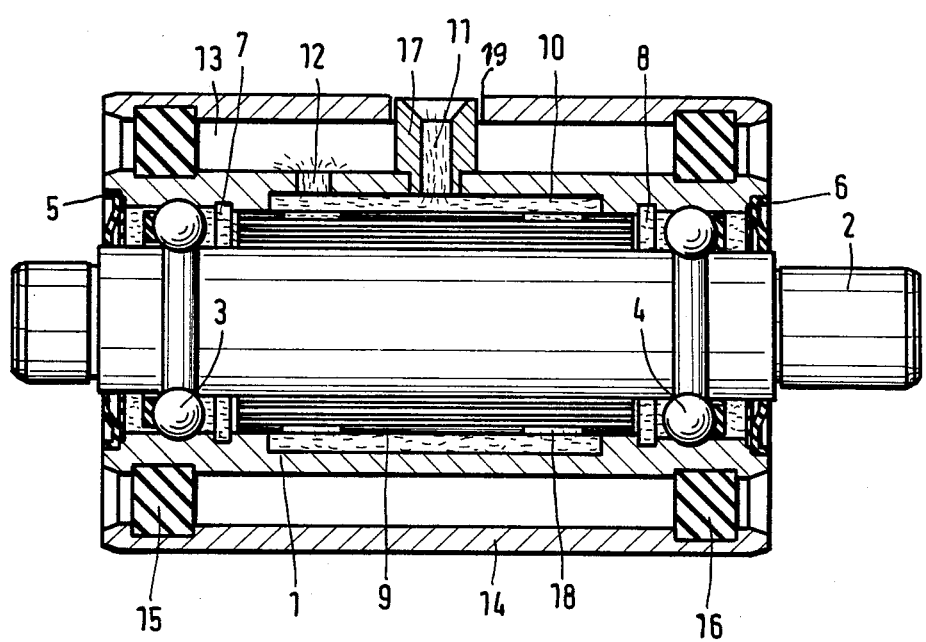

16,541,740

LUBRICATING ROTOR BEARINGS IN OPEN END SPINNING MACHINES

BACKGROUND OF THE INVENTION

The present invention relates to a rotor bearing assembly requiring periodic replenishment of lubricant and in particular to means for replenishing the lubricant of the rotor bearing assembly of an open end spinning machine.

In open end spinning machines, for example, a cup shaped spinner is mounted at the end of a shaft, the other end of which is coupled to means, such as a belt drive, to rotate both shaft and cup at very high speeds. The shaft is journalled in a pair of spaced roller bearings, the outer race of which is fixed or formed in a surrounding cylindrical housing. Because of the high speed at which the shaft is rotated, adequate provision for continuous lubrication must be made.

In U.S. Pat. No. 4,472,004 corresponding to German patent publication P 30 27 492.1-12, an open end rotor assembly is shown in which a perforated band is helically wound about the shaft, an annular space is provided between the band and the housing for the storage of extra grease. The bearings and this extra space are initially packed with grease, from which under operation heat and speed of the shaft cause oil to leak from the grease around the bearings, thus providing the actual lubricant for the bearings. The oil is replenished from the extra grease in the annular storage space which passes by capillary action through the windings of the band. After some period of high speed operation, all of the grease is exhausted of the oil and may itself be exhausted. The disadvantage of this construction is in the fact that in order to refill the assembly with fresh oil ladened grease, the bearing assembly has to be removed from the machine. This allows a fresh supply of lubricant to be pumped into the assembly through a feed opening, under such force that the old oil and grease is completely removed and new grease emerges from a discharge opening. This requires considerable down time in operation of the spinning machine.

It is an object of the present invention to provide a system and construction wherein relubrication of the bearings may be made without removal of the rotor bearing assemblies from the machine.

Other objects and advantages will be apparent from the following disclosure.

SUMMARY OF THE INVENTION

According to the present invention a rotor bearing assembly in which a shaft is journalled within a housing by a pair of spaced bearings packed in a quantity of grease, and having an oil guide surrounding the shaft and a storage space between the guide and the housing for retaining a supply of grease capable of releasing oil into the guide is provided with means for selectively replenishing the storage space with a fresh supply of grease. The means comprises an inlet for the introduction of fresh grease extending through the housing into the storage space, an outlet through the housing for discharging a quantity of grease from the storage space and a collection chamber exterior of the housing for receiving the discharged grease.

The collection chamber is defined by a tubular casing surrounding and spaced from the housing. The casing is supported by a pair of axially spaced supporting rings sealing the ends of the collection chamber.

A feed nipple extends through the casing into sealed connection with the inlet to the storage space, thus keeping the fresh lubricant free of contamination.

Full details of the invention are set forth in the following description and are shown in the accompanying drawing.

BRIEF DESCRIPTION OF THE DRAWING

The FIGURE is a radial sectional view of the rotor assembly of an open ended spinning machine showing the present invention.

DESCRIPTION OF THE INVENTION

Turning to FIG. 1 an open-end rotor shaft assembly for a spinning machine is formed of housing 1, such as metal or the like, in which a shaft 2 is journalled by a pair of spaced ball bearings 3 and 4. The bearing races are formed by grooves worked directly into the outer surface of the shaft and the inner surface of the housing 1. End seals 5 and 6 enclose the ends of the housing between it and the shaft and seal the bearings from the exterior.

A quantity of grease, shown by numerals 7 and 8, is packed initially in proximity to the bearings 3 and 4 respectively. The interior of the housing is provided with a band 9 helically wound about the shaft and abutting on its exterior with the housing 1. The housing is formed with an annular groove forming an annular storage space 10 about the band 9 for an additional quantity of grease; an inlet 11, located generally midway between its axial ends; and a discharge outlet 12 offset toward one side.

Surrounding the housing 1 and spaced therefrom so as to form an annular collection chamber 13 with it is a sleeve or tubular casing 14. The casing 14 is supported, at each of its ends on the housing 1, by elastic support rings 15 and 16, respectively fixed in suitable grooves so as to be axially immovable. The support rings 15 and 16 seal the axial ends of the collection chamber 13. Suitable adhesive fixatives may be used.

Extending through the casing 14 into sealed connection with the inlet 11 is a feed nipple 17 through which replacement grease is supplied. An annular slot 19 is provided around the nipple 17 to prevent the nipple from touching the casing 14 and thus nullify the elastic clamping of the rotor bearing housing and the casing attained by the use of the elastic support rings 15, 16. The slot 19 permits evacuation of air from the collection chamber 13.

The band 9 is provided with a plurality of holes 18 on the exterior winding so that a plurality of radial guide passages and axial passages between windings of generally capillary size are formed through which the oil seeps. Because of its radial outward tension, the band does not touch the shaft 2.

Placing the apparatus in use, the roller bearings 3 and 4 are lubricated with grease during assembly of the shaft in the housing. Additionally, a quantity of grease is located in the storage space 10 between the housing and the band 9. During operation of the rotor, oil is delivered to the roller bearings from the quantities of grease 7 and 8. The helical guide 9 permits oil to pass from the extra grease supply kept in the grease storage space 10 by moving through the holes 18 into the axial capillary slits between the windings of the helical guide. As a result of the capillary action the oil is fed to the grease quantities 7 and 8, thus enriching the latter as it exhausts itself of the initial oil content.

Since the proportion of oil in the grease supply in the grease storage space 10 is also not inexhaustible, fresh grease with preproportioned quantities of oil is delivered periodically to this supply by way of the grease feed opening 11. The fresh grease serves to displace a corresponding quantity of the old grease in the storage space 10, which has been freed of its oil content due to the capillary action. The fresh grease presses the old grease through the outlet 12 into the exterior collection space 13. This collection chamber is designed in annular shape and is limited by the support rings, 15, 16 the rigid housing 1 and the casing 14. Preferably, the collection chamber 13 is made large enough to accommodate the displaced old grease of more than ten relubrications. Of course, the space 13 may be enlarged by providing larger support rings 15 and 16. The support rings 15, 16, are constructed elastically so that the bearing forces in the rotor bearing, which is designed for rotational speeds of up to 80,000 rpm, can be reduced.

The nipple 17 projecting through a bore in the casing 14 facilitates the relubrication without contamination with the old grease in the collection space 13.

During assembly of the rotor with the bearing attention must be paid only to the seating of the nipple 17 at a predetermined site in the machine which site will be accessible to manual or automatic feeding of the relubrication grease. Up to 200 bearings in a rotor spinning frame can relubricate within a short period with a special proportioning lubricating device because the bearing assemblies do not have to be removed and the additional work resulting from the previously required removal of the ejected old grease is no longer necessary.

Various modifications and changes have been suggested and others will be obvious to those skilled in this art. Accordingly, it is intended that the present disclosure be taken as illustrative only and not as limiting of the present invention.

What is claimed is:

1. In a rotor bearing assembly having a shaft journalled within a housing by a pair of spaced bearings and having an oil guide surrounding said shaft, said housing and said oil guide defining a storage space for retaining a supply of grease and being capable of releasing oil into said oil guide, the improvement comprising means for selectively replenishing the storage space with a fresh supply of grease comprising an inlet extending radially through said housing into said storage space for the introducing of fresh grease thereto, an outlet through said housing for discharging a quantity of grease from said storage space and a tubular casing surrounding and spaced from said housing to define a collection chamber exterior of said housing for receiving said discharged grease, said casing being supported by a pair of axially spaced elastic support rings sealing the ends of said collection chamber.

2. The assembly according to claim 1 including a feed nipple extending through said casing into sealed connection with said inlet to said storage space.

* * * * *